United States Patent [19]
Shibahara

[11] Patent Number: 6,147,731
[45] Date of Patent: Nov. 14, 2000

[54] LIQUID CRYSTAL DISPLAY PANEL AND LIQUID CRYSTAL DISPLAY DEVICE

[75] Inventor: Hideo Shibahara, Tokyo, Japan

[73] Assignee: NEC Corporation, Tokyo, Japan

[21] Appl. No.: 09/271,288

[22] Filed: Mar. 17, 1999

[30] Foreign Application Priority Data

Mar. 20, 1998 [JP] Japan .................................. 10-090653

[51] Int. Cl.[7] .............................................. G02F 1/1333
[52] U.S. Cl. ........................................ 349/110; 349/141
[58] Field of Search .................... 349/110, 111, 349/141

[56] References Cited

FOREIGN PATENT DOCUMENTS

| 0 644 452 | 2/1995 | European Pat. Off. . |
| 0 827 010 | 9/1997 | European Pat. Off. . |
| 63-21907 | 5/1988 | Japan . |
| 5-505247 | 8/1993 | Japan . |
| 11-2844 | 1/1999 | Japan . |

Primary Examiner—James A. Dudek
Attorney, Agent, or Firm—Sughrue, Mion, Zinn, Macpeak & Seas, PLLC

[57] ABSTRACT

Scanning signal lines and video signal lines are provided in a matrix on the surface of one of a pair of glass substrates between which liquid crystal is filled. In each pixel area, thin film transistor is provided corresponding to each of cross points of the scanning signal lines and video signal lines. A reference signal line is provided across adjacent pixel areas, and reference electrodes are provided on one side of the reference signal line and extend in a comb-like form into each pixel area. A display electrode having a comb-like shape is provided such that it meshes with the reference electrodes. A light interception layer 111 having a width greater than that of display electrode and reference electrode is formed so as to overlap both of the electrode with an insulation film being interposed therebetween. Leakage of light from around sides of the display electrode and reference electrode is prevented even if liquid crystal molecules are inclined by an electric field produced by a voltage applied between the display electrode and reference electrode.

10 Claims, 6 Drawing Sheets

LIQUID CRYSTAL DISPLAY PANEL AND LIQUID CRYSTAL DISPLAY DEVICE

BACKGROUND OF THE INVENTION

1. Field of the Invention

This invention relates to a liquid crystal display panel and a liquid crystal display device which include a pixel area having a display electrode and a reference electrode to modulate light passing through a liquid crystal layer filled between substrates by application of a voltage between the display electrode and the reference electrode.

2. Description of the Related Art

Conventionally, a liquid crystal display device provided with a liquid crystal display panel of the active matrix type which employs an active element such as a thin film transistor has come into use as a display terminal such as an office automation equipment owing to its advantages that it is small in thickness and light in weight and that it displays an image of a high picture quality.

As a liquid crystal display panels of the active matrix type, a display system, such as TV, having a characteristic of such a wide angle of visibility that it can be viewed by a large number of people, that is, a display system of the transverse field type, is known, in which, as described in Japanese Patent Laid-open No. 505247/1993 and Japanese Patent Publication No. 21907/1988, an electric field is formed between a display electrode and a reference electrode, formed on one of opposed substrates, in a direction parallel to the substrates to actuate a liquid crystal filled between the substrates, thereby modulating and displaying the light entering the liquid crystal from a gap between the display electrode and the reference electrode.

However, in the conventional liquid display panel of the horizontal field type disclosed in Japanese Patent Laid-Open No. 505247/1993 or Japanese Patent Publication No. 21907/1988, in addition to an electric field which is produced in a horizontal direction substantially parallel to the substrates, a vertical electric field also is produced in the proximity of side edges of the display electrode and reference electrode. Therefore, the directions of the major axes of molecules of the liquid crystal which originally extend substantially parallel to the substrates are inclined with respect to the substrates. Consequently, leakage of light occurs at or around the side edges of the display electrode and reference electrode, and this deteriorates the contrast. Further, as the major axes of the liquid crystal molecules are inclined, when the electric field disappears, returning of liquid crystal molecules to their original directions is so retarded that a problem of an afterimage phenomenon is produced.

SUMMARY OF THE INVENTION

The present invention has been made in view of such a situation as described above, and it is an object of the present invention to provide a liquid crystal display panel and a liquid crystal display device which prevent leakage of light in the proximity of side edges of a display electrode and a reference electrode.

In order to attain the object described above, according to an aspect of the present invention, there is provided a liquid crystal display panel, comprising a pair of substrates having a light transmission property, a liquid crystal layer filled between the pair of substrates, a pixel area including a display electrode and a reference electrode provided on one of the opposing surfaces of the pair of substrates for producing an electric field substantially parallel to the pair of substrates in the liquid crystal layer by a voltage applied between the display electrode and the reference electrode to modulate light which passes through the liquid crystal layer, and a light interception layer provided on one of the opposing surfaces of the pair of substrates and positioned nearer to one of the opposing surfaces than the display electrode and reference electrode to intercept the light which passes between the display panel and the reference electrode.

According to another aspect of the present invention, there is provided a liquid crystal display panel wherein the light interception layer is stacked on the display electrode and the reference electrode, with its width being greater than that of the display electrode and the reference electrode.

According to a further aspect of the present invention, there is provided a liquid crystal display panel wherein the display electrode and the reference electrode are formed substantially linearly, and the light interception layer is formed substantially linearly in parallel to the display electrode and the reference electrode.

According to a still further aspect of the present invention, there is provided a liquid crystal display panel wherein the light interception layer is formed by printing.

According to a yet further aspect of the present invention, there is provided a liquid crystal display panel wherein the light interception layer is formed from a material composed mainly of organic substances by printing.

According to a yet further aspect of the present invention, there is provided a liquid crystal display panel wherein the light interception layer is stacked on the display electrode and reference electrode with its width being greater than that of the display electrode and reference electrode by 2–4 $\mu$m.

According to a yet further aspect of the present invention, there is provided a liquid crystal display panel wherein an orientated film is stacked on each of the pair of substrates so that the orientation directions of the major axes of liquid crystal molecules forming the liquid crystal is substantially parallel to each other on the interfaces of the pair of substrates and oriented at an angle of approximately 85 degrees with respect to the direction of the electric field produced by the voltage applied between the display electrode and the reference electrode.

According to a yet further aspect of the present invention, there is provided a liquid crystal display panel wherein a polarizing plate is formed on each of the pair of substrates, and one of the polarizing plates is set such that the direction of light which passes through the polarizing plate is oriented at an angle of approximately 85 degrees with respect to the direction of the electric field produced by the voltage applied between the display electrode and the reference electrode, while the other polarizing plate is set such that the direction of light which passes through the other polarizing plate is substantially perpendicular to the direction of the light which passes through said one polarizing plate.

According to a yet further aspect of the present invention, there is provided a liquid crystal display panel wherein the distance between the pair of substrates is approximately 4.1 $\mu$m.

According to a yet further aspect of the present invention, there is provided a liquid crystal display device, comprising any liquid crystal display panel described above, and an image processing device for suitably applying a voltage between the display electrode and the reference electrode of the liquid crystal display panel.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

Embodiments of the present invention are described below with reference to the drawings.

Figure 1:
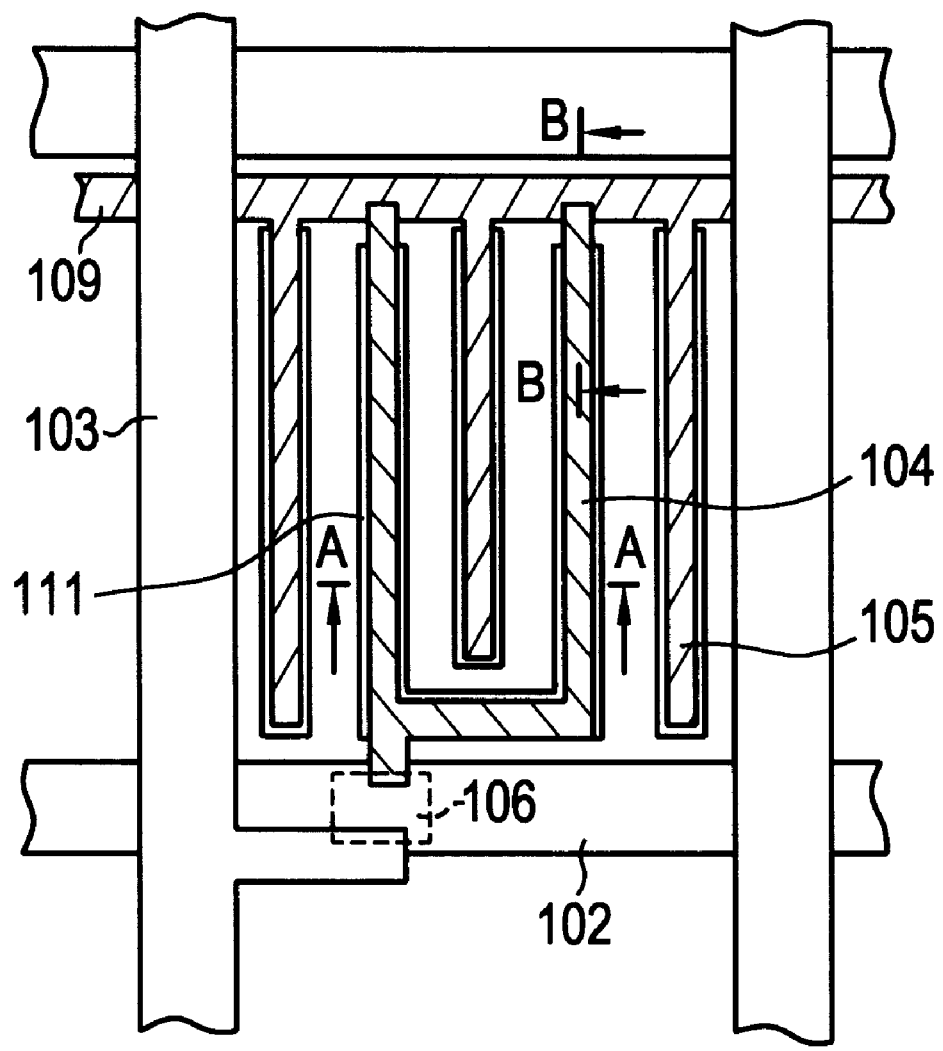
FIG. 1 is a plan view of a pixel area of one of two substrates showing a liquid crystal display panel of an embodiment of the present invention.
Figure 2:
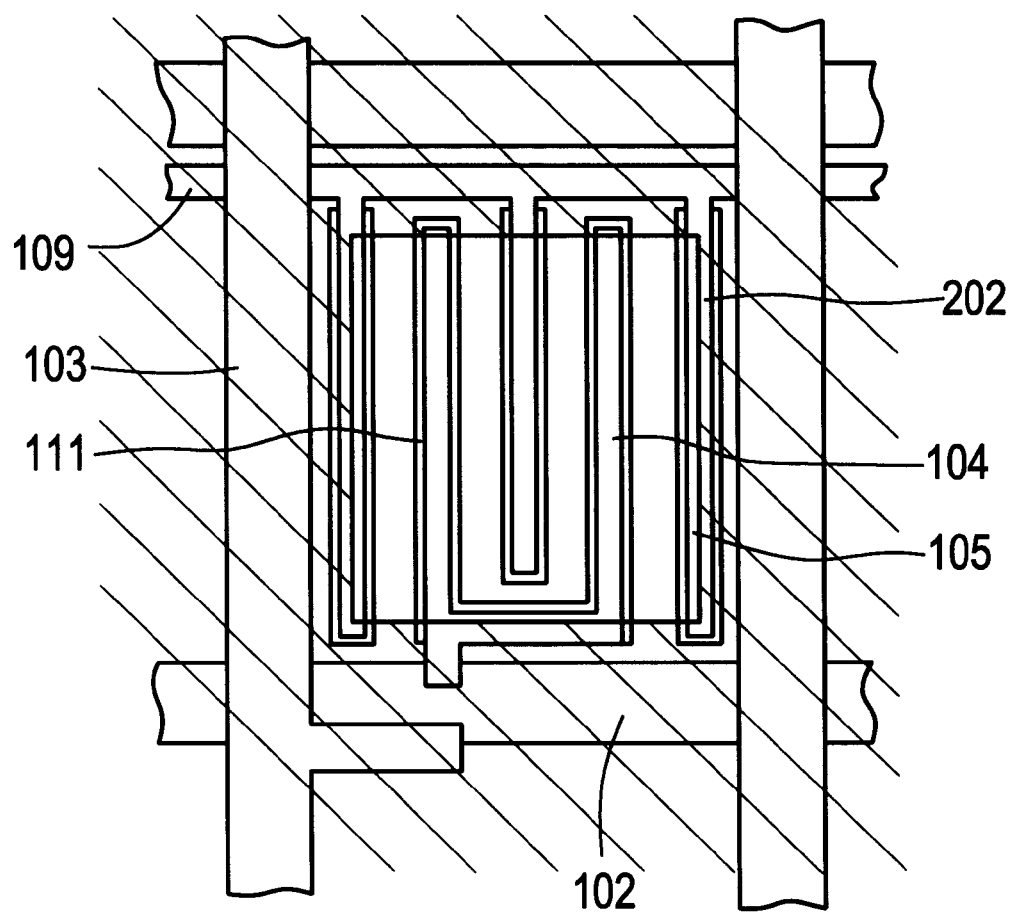
FIG. 2 is a plan view showing a relationship between a light interception film on the other substrate side of the liquid crystal display panel of FIG. 1 and the pixel area of the one substrate.
Figure 3:
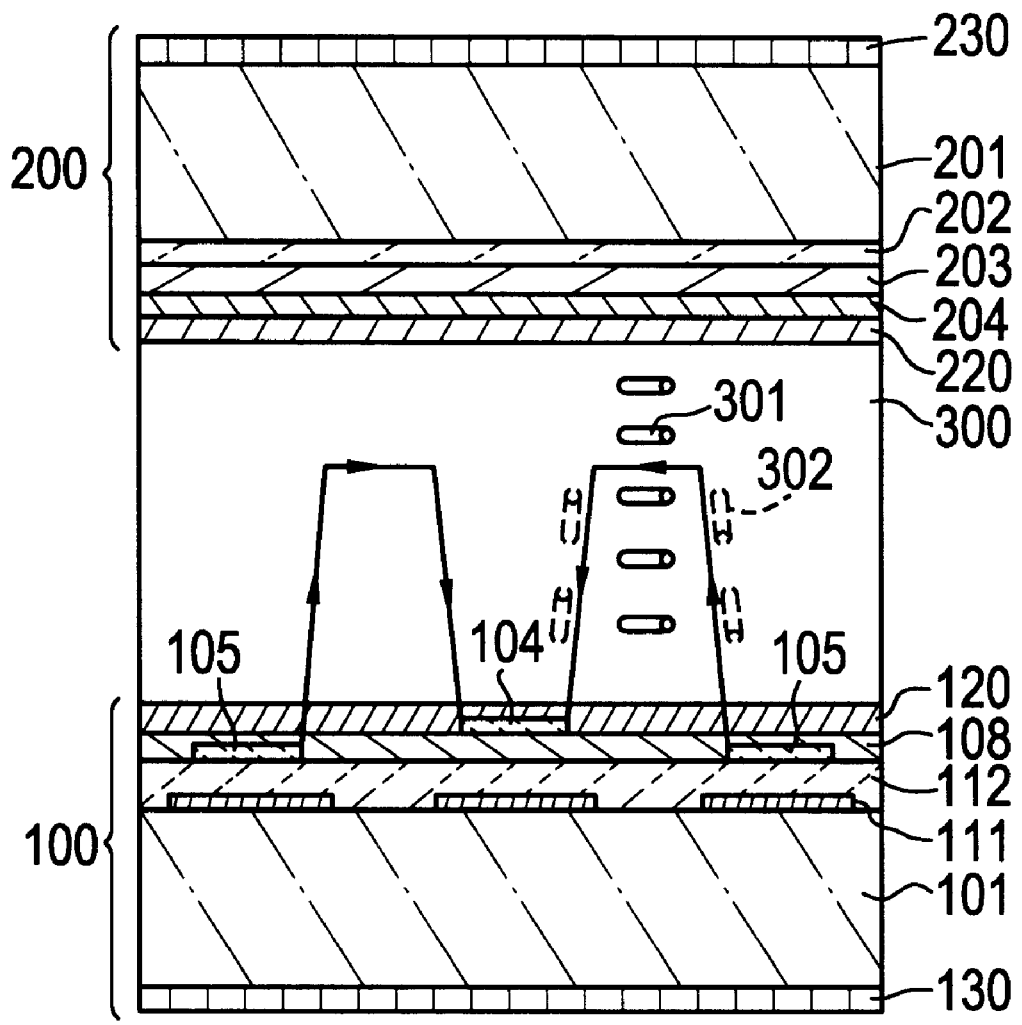
FIG. 3 is a sectional view taken along line A—A of FIG. 1.
Figure 4:
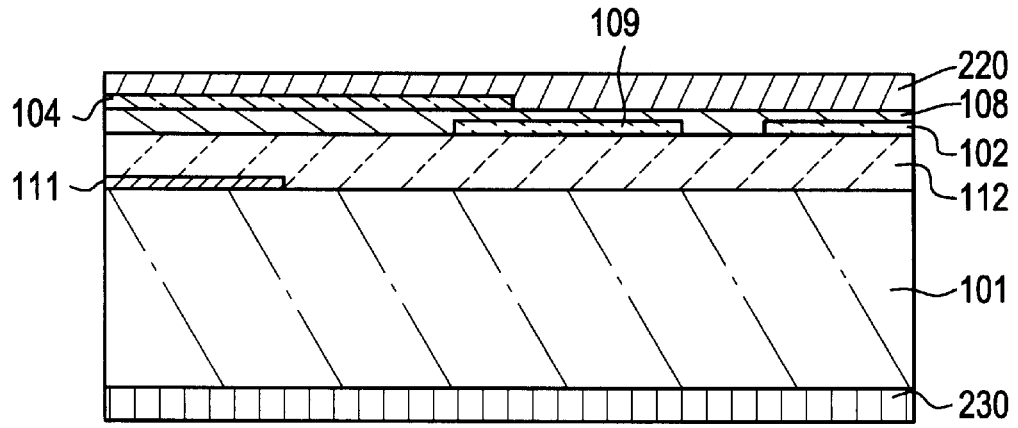
FIG. 4 is a sectional view taken along line B—B of FIG. 1.
Figure 5:
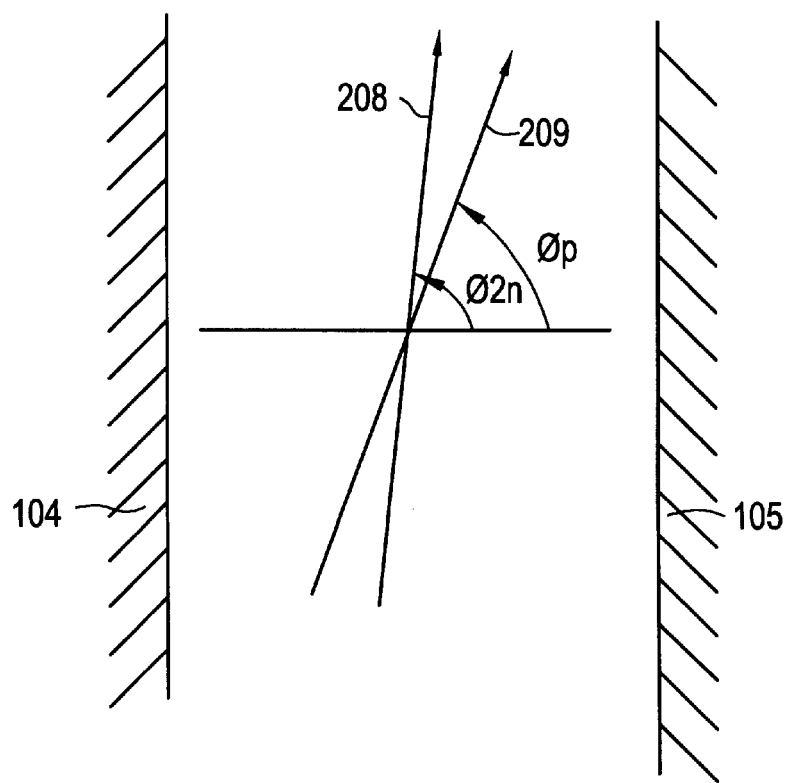
FIG. 5 is a diagrammatic view showing angles of a rubbing direction and a polarizing film transmission axis with respect to the direction of an electric field.
Figure 6:
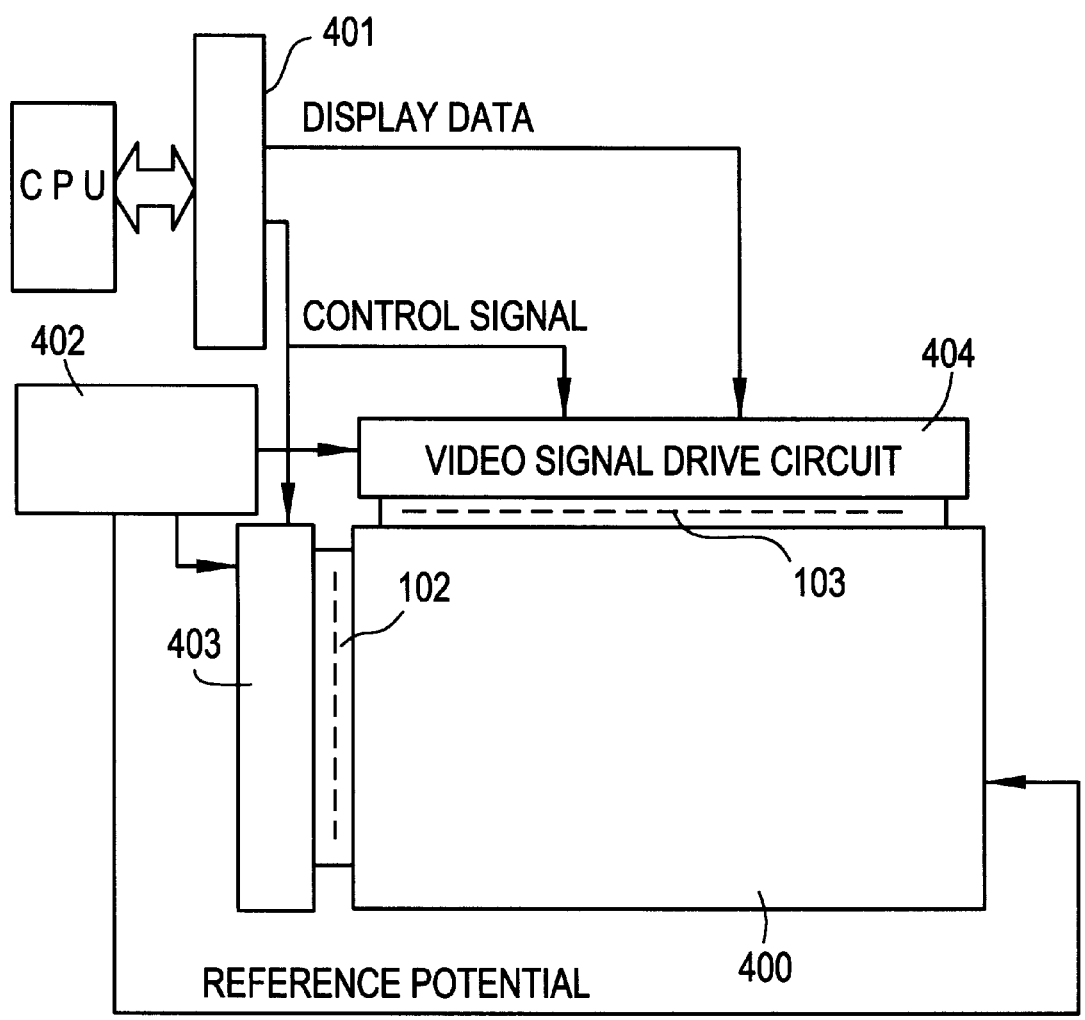
FIG. 6 is a block diagram showing a liquid crystal display device including the liquid crystal display panel.

FIG. 1 is a plan view of a pixel area of one of two substrates showing a liquid crystal display panel of an embodiment of the present invention; FIG. 2 is a plan view showing a relationship between a light interception plate on the other substrate side of the liquid crystal display panel of FIG. 1 and a pixel area of said one substrate; FIG. 3 is a sectional view taken along line A—A of FIG. 1; FIG. 4 is a sectional view taken along line B—B of FIG. 1; FIG. 5 is a diagrammatic view showing angles of a rubbing direction and a polarizing plate transmission axis with respect to the direction of an electric field; and FIG. 6 is a block diagram showing a liquid crystal display device including the liquid crystal display panel.

Referring to FIGS. 1 to 4, reference numeral 400 denotes a liquid crystal display panel. This liquid crystal display panel 400 includes a pair of transparent glass substrates 101, 201 as substrates each of which has a thickness of, for example, approximately 1.1 mm and has polished surfaces and a light transmission property. A plurality of elongated belt-like scanning signal lines 102 are provided substantially parallelly on one of the surfaces of the glass substrate 101 and a plurality of elongated belt-like video signal lines 103 are provided substantially parallel by and perpendicularly to the scanning signal lines 102 such that a plurality of pixel areas are provided in a matrix pattern.

In each pixel area, a thin film transistor (TFT) 106, as an active element, is provided corresponding to each intersection of the scanning signal lines 102 and video signal lines 103. Elongated belt-like reference signal lines 109 are provided on one surface of the glass substrate 101 and extend across adjacent pixel areas. Reference electrodes 105 are formed from a longitudinal edge of a reference signal line 109 so as to extend in the form of a comb into adjacent pixel areas. Further, a display electrode 104 is provided in each pixel area. The display electrode 104 is formed into a comb-like shape in such a manner as to mesh with reference electrodes 105, and a voltage is applied to display electrode 104 through thin film transistor 106. Display electrode 104 and reference electrode 105 have substantially equal widths.

On one surface of glass substrate 101, light interception layer 111 is formed so as to overlap display electrode 104 and reference electrode 105 with insulation film 112 being interposed therebetween, for example, by a printing method wherein light interception layer 111 is formed by direct printing into a predetermined pattern using a material consisting principally of an organic substance. Light interception layer 111 has a width greater than that of display electrode 104 and reference electrode 105 preferably by 2–4 μm.

Further, orientation film 120 formed into a thin film from a polyimide or the like material and having a surface processed by rubbing is provided on the outermost surface on one side of glass substrate 101. Polarizing plate 130 is provided on a surface of glass substrate 101 opposite to the surface on which the pixel areas are provided to form a bottom side substrate 100.

On the other hand, as illustrated in FIG. 2, light interception layer 202 is provided on one side of the other glass substrate 201. Light interception layer 202 has an opening formed by cutting off a portion thereof corresponding to each pixel area of glass substrate 101, so that layer 202 has a window opened corresponding to each pixel area. Colored layer 203 of the three primary colors serving as a color filter is formed on the surface of light interception layer 202. Flattening film 204 of a transparent resin material is formed on the surface of colored layer 203. Further, orientated film 220, in the form of a thin film, formed from polyimide or the like and having a surface processed by rubbing is provided on the surface of flattening film 204. Polarizing plate 230 is provided on the surface of glass substrate 201 opposite to orientatied film 220, thereby forming a top side substrate 200.

Bottom side substrate 100 and top side substrate 200 are disposed so that the opposed surfaces thereof, on which orientation films 120, 220 are provided, respectively, are spaced apart by a gap d of, for example, approximately 4.1 μm. A nematic liquid crystal substance 300, liquid crystal, is filled into gap d and forms a liquid crystal display panel 400.

Rubbing processing of orientated films 120, 220 is performed in such a manner that, as shown in FIGS. 3 and 5, the rubbing directions being major axis orientation directions 208 of liquid crystal molecules 301 constituting a nematic liquid crystal composition 300 are approximately parallel on the interface between glass substrates 101, 201 and are oriented at an angle $\phi 2n$ of approximately 85 degrees with respect to the direction of an applied electric field.

For nematic liquid crystal composition 300, a nematic liquid crystal composition whose dielectric anisotropy $\Delta\epsilon$ is plus 7.3 (1 KHz) and whose refraction factor anisotropy $\Delta n$ is 0.073 (589 nm, 20° C.) is used. It is to be noted that refraction factor anisotropy A n is determined based on gap d between substrate 100 and substrate 200 using the following equation:

$$T=\sin^2(PI\Delta n\ d/\lambda)$$

(2 represents square, λ wavelength, and T transmittance) whereby a maximum transmission factor may be obtained.

Further, as shown in FIG. 5., polarizing plates 130, 230 are set such that polarizing layer transmission axis 209 which is the direction of light passing through one of the layers 120, 220, is oriented at an angle substantially equal to rubbing direction 208 of orientated films 120, 220, or in other words, angle φP formed between polarizing plate transmission axis 209 and the direction of an applied electric field is approximately 85 degrees and polarizing plate transmission axis 209 of the other layer is approximately perpendicular to polarizing plate transmission axis 209 of the one of the layers 120, 220.

Next, the construction of a liquid crystal display device which includes the liquid crystal display panel as described above is described with reference to FIG. 6.

Vertical scanning circuit 403 for successively supplying scanning signals to a plurality of scanning signal lines 102 is connected to liquid crystal display panel 400. Further, video signal drive circuit 404 for supplying voltages of a video signal to video signal lines 103 corresponding to the timings of voltages of scanning signals successively supplied to scanning signal lines 102 from vertical scanning circuit 403 is connected to liquid crystal display panel 400.

To vertical scanning circuit 403 and video signal drive circuit 404, liquid crystal driving power supply circuit 402 for supplying a voltage is connected and at the same time controller 401 which receives image information from CPU to separately output display data and control signals is connected, thereby forming the liquid crystal display device. It is to be noted that liquid crystal driving power supply circuit 402 also is connected to reference signal lines 109 to apply a voltage to reference signal lines 109.

Operations of the liquid crystal display device will be described below.

Glass substrate 101, on which display electrodes 104, reference electrodes 105, scanning signal lines 102, video signal lines 103, thin film transistors 106 and light interception layer 111 are formed beforhand in layers with insulation films 108, 112 being interposed therein to provide the pixel areas and orientation film 120 and glass substrate 201, on which light interception plate 202, colored layer 203, flattening film 204 and orientated film 220 are formed in layers, are disposed in opposition to each other with a gap of a predetermined dimension being formed therebetween so that orientation films 120, 220 are opposed to each other and spherical polymer beads are held in a dispersed condition between glass substrates 101, 201. Then, nematic liquid crystal substance 300 is filled into between the opposing surfaces of glass substrates 101, 201 so as to provide a gap d of approximately 4.1 μm, and the pair of glass substrates 101, 201 between which nematic liquid crystal substance 300 is filled are held between two polarizing plates 130, 230 to form liquid crystal display panel 400.

Next, the function of the embodiment will be described.

When a voltage is applied between display electrode 104 and reference electrode 105, a horizontal electric field substantially parallel to glass substrate 101 is produced and also a vertical electric field is produced as seen in FIG. 3, whereby directions of the major axes of liquid crystal molecules 302, which should be oriented in parallel to glass substrate 101, are inclined about the side edges of display electrode 104 and reference electrode 105 between display electrode 104 and reference electrode 105.

Since light interception layer 111, which has a greater width than display electrode 104 and reference electrode 105 so as to overlap both of the electrodes 104, 105, is positioned adjacent the sides of display electrode 104 and reference electrode 105, the light passing near the sides of display electrode 104 and reference electrode 105 is intercepted by light interception layer 111. Therefore, leakage of light from the sides of display electrode 104 and reference electrode 105 can be prevented.

As described above, in the embodiment described above, since light interception layer 111 is provided so as to be located nearer to glass substrate 101 than display electrode 104 and reference electrode 105, light passing between display electrode 104 and reference electrode 105 is intercepted. Consequently, even if a horizontal electric field nearly parallel to glass substrate 101 is produced and a vertical electric field is produced as seen in FIG. 3 by a voltage applied between display electrode 104 and reference electrode 105 to cause the major axis directions of liquid crystal molecules 302, which should be oriented in parallel to glass substrate 101, to be inclined around the side edges of display electrode 104 and reference electrode 105 between display electrode 104 and reference electrode 105, light is intercepted by light interception layer 111. As a result, leakage of light can be prevented and deterioration of contrast can be prevented. Further, an afterimage phenomenon which arises from a delay of returning of liquid crystal molecules 30 from their inclined positions when the electric field is turned off can be prevented.

Further, since light interception layer 111 is formed so as to have a greater width than that of display electrode 104 and reference electrode 105, leakage of light can be prevented using a simple structure.

Furthermore, since light interception layer 111 is formed so as to have a width greater than display electrode 104 and reference electrode 105 by 2–4 μm, leakage of light can be prevented with certainty without increasing the area of a pixel area.

Further, since light interception layer 111 is formed by a simple printing method, the productivity can be enhanced and the production cost can be reduced.

Furthermore, since light interception layer 111 is formed by a printing method from a material comprising an organic substance, as principal component, light interception layer 111 can be directly formed by printing using a predetermined pattern, and a pattern of light interception layer 111 can be formed only by a printing step, and hence the productivity can be enhanced and the production cost can be reduced.

On the other hand, since orientated films 120, 220 to be formed in layers on glass substrates 101, 201 are set in such a manner that rubbing directions which are the orientation directions 208 of major axes of liquid crystal molecules 301 are substantially parallel to each other on the interfaces of glass substrates 101, 201 and are oriented at an angle φ2n of approximately 85 degrees with respect to the direction of an electric field created by a voltage applied between display electrode 104 and reference electrode 105, the directions 208 are inclined by 5 degrees from a direction perpendicular to the direction of the electric field so that directions, to which liquid crystal molecules 301 are turned, are determined. Further, since a maximum transmission factor is obtained when liquid crystal molecules 301 are turned by 45 degrees, they can be rotated up to 45 degrees.

Furthermore, since polarizing plates 130, 230 formed in layers on glass substrates 101, 201 are set in such a manner that polarizing plate transmission axis 209 being the directions of light passing through one of glass substrates 101, 201 is substantially equal to the rubbing direction, that is, polarizing plate transmission axis 209 is oriented at an angle φP of approximately 85 degrees with respect to the direction of an electric field produced by a voltage applied between display electrode 104 and reference electrode 105 and polarizing plate transmission axis 209 of the other glass substrates 101, 201 extends perpendicularly to polarizing plate transmission axis 209 of one of glass substrates 101, 201, when the electric field is turned off, light is intercepted surely by the other one of glass substrates 101, 201 which has polarizing plate transmission axis 209 perpendicular to the rubbing direction, thereby displaying black, but when the electric field is turned on, liquid crystal molecules 301 are turned so that the liquid crystal axis approaches the polarizing plate transmission axis 209 of the other one of glass substrates 101, 201. Consequently, light passes surely through the liquid crystal, thereby displaying white. As a result, the contrast between white and black display is enhanced.

Further, since the distance between glass substrates 101, 201 is set to 4.1 µm, the productivity can be enhanced and the production cost can be reduced.

Next, another embodiment is described with reference to FIG. 7.

In the embodiment shown in FIG. 7, light interception layer 111, which is described with reference to FIGS. 1 to 6, is formed so as to extend linearly in the direction of columns across adjacent pixel areas.

Figure 7:
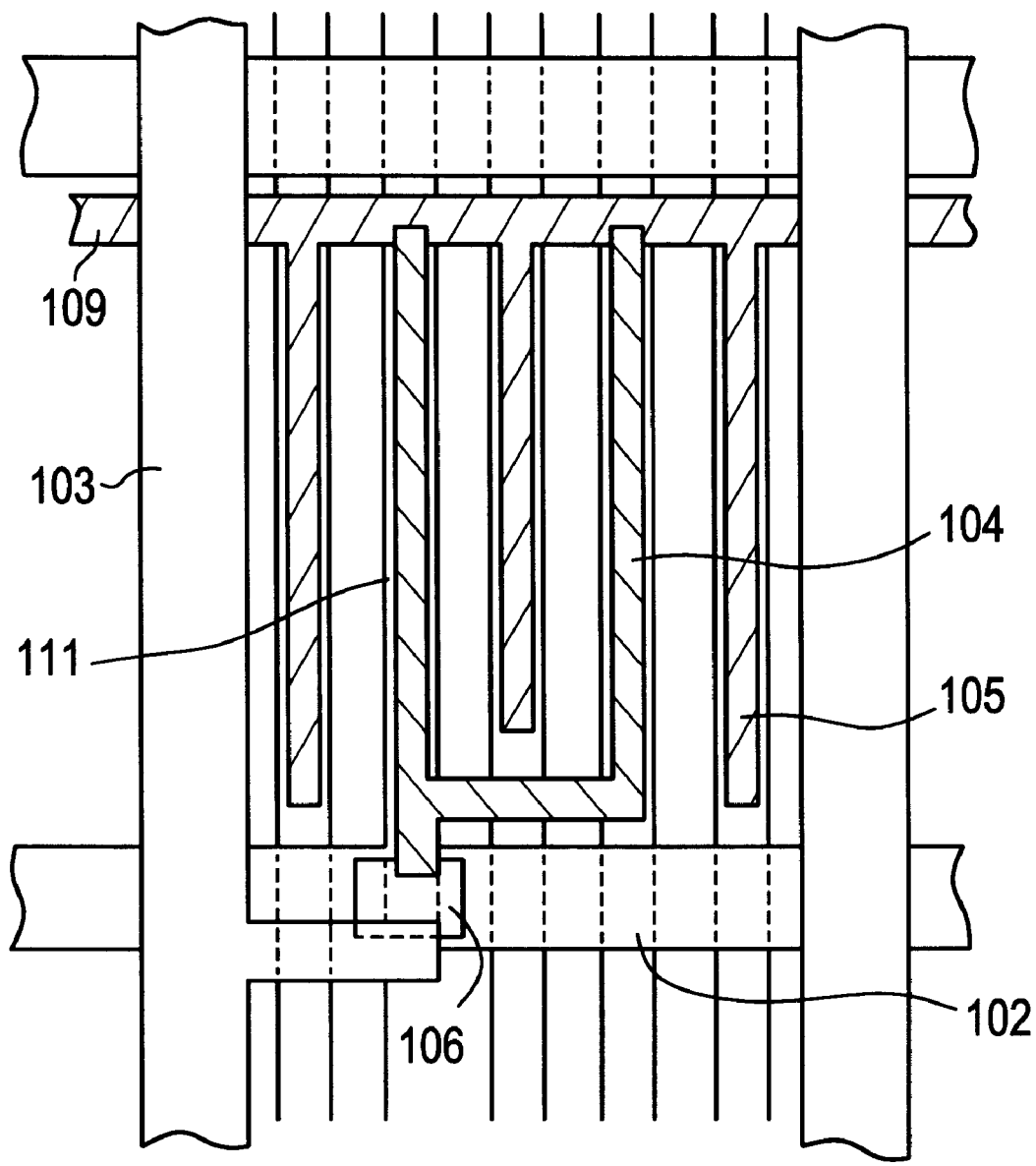
FIG. 7 is a plan view of a pixel area of one of two substrates showing a liquid crystal display panel of another embodiment of the present invention.

According to the structure shown in FIG. 7, the structure of light interception layer 111 can be simplified and can be formed without using a photoresist step. Consequently, the degree of freedom in selection of a manufacture process can be increased and the productivity can be enhanced.

While liquid crystal display panel 400 of the so-called horizontal field type is described in the embodiments as described above, the present invention can be applied also to any other liquid crystal display panel. And by applying the present invention, as in the embodiments described above, to a liquid crystal display panel of the horizontal field type, wherein the liquid crystal is operated by an electric field substantially parallel to glass substrates 101, 201 and liquid crystal molecules 302, which should originally be oriented in parallel to glass substrates 101, 201, are inclined by an electric field produced also in a vertical direction, and hence leakage of light occurs, the leakage of light can be prevented significantly.

Gap d between glass substrates 101, 201 can be set to any dimension in view of the productivity, size, weight, cost and so forth.

Further, the rubbing processing of orientation films 120, 220 and setting of directions of polarizing plate transmission axes 209 of polarizing plates 130, 230 are not limited to those of the embodiments described above.

Furthermore, while it is described that a material whose principal component is an organic substance is used to form light interception layer 111 by printing, light interception layer 111 may be formed alternatively, for example, by forming a metal film over the entire surface of glass substrate 101, printing a light interception layer pattern with a resist, removing unnecessary part of the metal film by etching and removing the resist. According to this method, a photoresist step is not required, so that the productivity can be improved and production cost can be reduced.

Light interception layer 111 may be made of any other material such as an organic material or an inorganic material.

According to the present invention, since a light interception layer is provided such that it is positioned adjacent a substrate with respect to a display electrode and a reference electrode so that it may intercept light which passes around the display electrode and the reference electrode, even if liquid crystal molecules present around side edges of the display electrode and the reference electrode between the display electrode and the reference electrode are inclined by a voltage applied between the display electrode and the reference electrode, leakage of light can be prevented by a light intercepting action of the light interception plate. Consequently, an incomplete contrast can be prevented and an afterimage phenomenon which arises from a delay of returning of the liquid crystal molecules from their inclined positions when the electric field disappears can be prevented.

Further, since the light interception layer is formed in an overlapping with the display electrode and the reference electrode and has a greater width than that of the display electrode and the reference electrode, leakage of light can be prevented by a simple structure.

Furthermore, since the light interception layer has a width greater than that of the display electrode and the reference electrode by 2–4 µm, leakage of light can be prevented while increase in size of pixel areas due to increased width can be prevented.

Further, since the light interception layer is formed by printing which provides a simple manufacturing process, the productivity can be enhanced and the production cost can be reduced.

Furthermore, since a material whose principal component is an organic substance is employed, the light interception layer can be directly formed by printing it into a predetermined pattern, and the productivity can be enhanced and the production cost can be reduced.

Further, since the distance between the pair of glass substrates is set to 4.1 µm, the manufacture process is simple, and the productivity can be improved and the production cost can be reduced.

And since oriented films to be formed in layers on glass substrates are set in such a manner that rubbing directions which are the orientation directions of major axes of the liquid crystal molecules are substantially parallel to each other on the interfaces of glass substrates and oriented at an angle of approximately 85 degrees with respect to the direction of an electric field created by a voltage applied between the display electrode and the reference electrode, the directions 208 are inclined by 5 degrees from a direction perpendicular to the direction of the electric field so that directions to which the liquid crystal molecules are turned are determined. Further, since a maximum transmission factor is obtained when liquid crystal molecules are turned by 45 degrees, the molecules can be turned up to 45 degrees.

Furthermore, since polarizing plates formed in layers on glass substrates are set in such a manner that polarizing plate transmission axis being the directions of light passing through one of glass substrates is substantially equal to the rubbing direction, that is, polarizing plate transmission axis is oriented at an angle of approximately 85 degrees with respect to the direction of an electric field produced by a voltage applied between display electrode 104 and reference electrode 105 and polarizing plate transmission axis of the other one of glass substrates extends perpendicularly to polarizing plate transmission axis of one of glass substrates, when the electric field is turned off, light is intercepted surely by the other one of glass substrates which has polarizing plate transmission axis perpendicular to the rubbing direction, thereby displaying black, but when the electric field is turned on, liquid crystal molecules are turned so that the liquid crystal axis approaches the polarizing plate transmission axis of the other one of glass substrates. Consequently, light passes surely through the liquid crystal, thereby displaying white. As a result, the contrast between white and black can be enhanced.

Further, according to a liquid crystal display device which includes a liquid crystal display panel which can prevent leakage of light therefrom and an image processing device for suitably applying a voltage between a display electrode and a reference electrode, an incomplete contrast can be prevented by the prevention of leakage of light and a good liquid crystal display can be provided.

What is claimed is:

1. A liquid crystal display panel, comprising:

a pair of substrates having a light transmission property;

a liquid crystal layer comprising a liquid crystal filled into between said pair of substrates;

a pixel area including a display electrode and a reference electrode provided on one of the opposed surfaces of said pair of substrates for producing in said liquid crystal layer an electric field substantially parallel to said pair of substrates by a voltage applied between said display electrode and said reference electrode to modulate the light passing through said liquid crystal layer; and a light interception layer disposed on said one of the opposed surfaces of said pair of substrates so as to be located nearer to said one of the opposed surfaces than said display electrode and reference electrode to intercept the light passing through between said display panel and reference electrode.

2. The liquid crystal display panel as claimed in claim 1, wherein said light interception layer has a width larger than that of said display electrode and reference electrode so as to overlap both the electrodes.

3. The liquid crystal display panel as claimed in claim 1, wherein said display electrode and reference electrode are formed substantially linearly, and said light interception layer is formed substantially linearly in parallel to said display electrode and reference electrode.

4. The liquid crystal display panel as claimed in claim 1, wherein said light interception layer is formed by printing.

5. The liquid crystal display panel as claimed in claim 1, wherein said light interception layer comprises an organic substance, as a principal component, and is formed by painting.

6. The liquid crystal display panel as claimed in claim 1, wherein said light interception layer has a width greater than that of said display electrode and said reference electrode by 2–4 $\mu$m.

7. The liquid crystal display panel as claimed in claim 1, wherein an orientation film is formed on each of said pair of substrates and is set so that the orientation directions of the major axes of liquid crystal molecules constituting liquid crystal are substantially parallel to each other on the interfaces of said pair of substrates and oriented at an angle of approximately 85 degrees with respect to the direction of an electric field produced by the voltage applied between said display electrode and said reference electrode.

8. The liquid crystal display panel as claimed in claim 1, wherein a polarizing plate is formed on each of said pair of substrates, and one of the polarizing plates is set so that the direction of light passing through the polarizing plate is oriented at an angle of approximately 85 degrees with respect to the direction of an electric field produced by the voltage applied between said display electrode and said reference electrode, while the other polarizing plate is set so that the direction of light passing through the other polarizing plate is substantially perpendicular to the direction of the light passing through said one of the polarizing plates.

9. A liquid crystal display panel as claimed in claim 1, wherein the distance between said pair of substrates is approximately 4.1 $\mu$m.

10. A liquid crystal display device, comprising:

a liquid crystal display panel as claimed in claim 1; and an image processing device for suitably applying a voltage between a display electrode and a reference electrode of said liquid crystal display panel.

* * * * *

UNITED STATES PATENT AND TRADEMARK OFFICE
CERTIFICATE OF CORRECTION

PATENT NO. : 6,147,731
DATED : November 14, 2000
INVENTOR(S) : Hideo SHIBAHARA

It is certified that error appears in the above-identified patent and that said Letters Patent is hereby corrected as shown below:

Column 4, line 50 delete "An" insert --△n--.

Signed and Sealed this

Twenty-ninth Day of May, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 6,147,731 Page 1 of 1
DATED : November 14, 2000
INVENTOR(S) : Hideo Shibahara It is certified that error appears in the above-identified patent and that said Letters Patent is hereby corrected as shown below:

Column 4,
Line 56, delete "An" insert -- Δ n --.

Signed and Sealed this

Seventeenth Day of August, 2004

JON W. DUDAS
*Acting Director of the United States Patent and Trademark Office*